April 23, 1968     W. O. YOUNG, JR     3,379,930
AUTOMOTIVE LIGHTING SYSTEM
Filed March 21, 1966
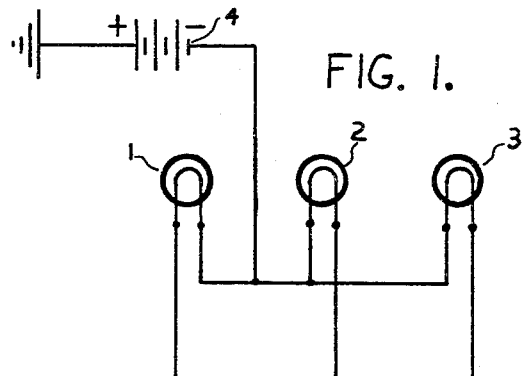
FIG. 1.
FIG. 2.
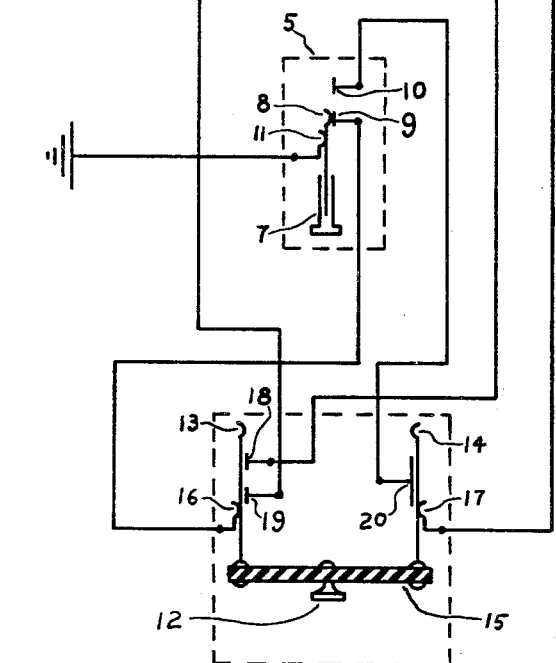
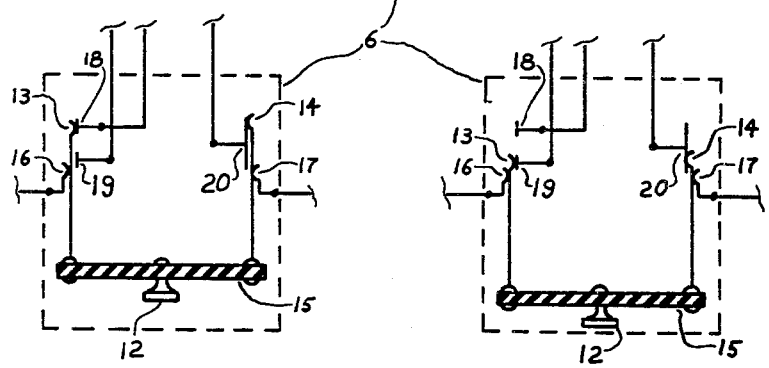
FIG. 3.     FIG. 4.
INVENTOR:
William O. Young. Jr.

United States Patent Office 3,379,930
Patented Apr. 23, 1968

3,379,930
AUTOMOTIVE LIGHTING SYSTEM
William O. Young, Jr., 116 Marlin Drive,
Spartanburg, S.C. 29302
Filed Mar. 21, 1966, Ser. No. 536,067
1 Claim. (Cl. 315—82)

ABSTRACT OF THE DISCLOSURE

An automotive lighting system provided with a three position hand operated switch for selectively energizing the bright headlights, dim headlights and parking lights. A double pole switch is electrically connected to the hand operated switch for selectively energizing the parking lights and the dim headlights when the hand operated switch is in one position, and for selectively energizing said bright headlights and said dim headlights when said hand operated switch is in another position.

---

This invention relates to an improvement applicable to the conventional automotive lighting circuit, which improvement renders the circuit more useful with regard to safety and convenience when the vehicle is operated in a locality which prescribes that parking lights be used for night driving within its confines. More specifically, the improvement causes the conventional foot operated dimmer switch to become an active part of the lighting circuit when the dash mounted switch is in the conventional parking light position. The advantages realized through this improvement, and the method by which this object is achieved, are described below and are shown diagrammatically in the accompanying drawing.

In conventional automobile light systems, two principal switches are used to control the lighting configuration. One is a dash mounted, hand operated, three position selector switch. The other is a floor mounted, foot operated, two position latching switch, which, upon depression and release, will mechanically latch in the electrical contact configuration opposite to that prior to being depressed. The dash mounted switch normally has three positions; when fully depressed, all exterior lights are off; at the mid-position, the parking lights only are on and; when fully extended, either the bright or dim headlight beams are on, depending on the contact configuration of the floor mounted switch at the time. When the dash mounted switch is in the mid position, operation of the floor mounted switch has no effect on the lighting configuration. With the dash mounted switch in the fully extended position, the floor mounted switch is normally used in highway driving to conveniently change from dim to bright headlight beams, and vice versa. The lighting system described above serves well for normal highway driving, since only the bright and dim beams are normally used, and only foot action is needed to switch from one beam to the other. The driver therefore does not have to remove his hand from the steering wheel, or take his eyes or attention away from the road to switch beams. However, in many well-lighted cities, particularly in the United States and Europe, it is either the practice or prescribed by law to drive at night with parking lights only. It is further the practice to operate the dash mounted switch to change from parking lights to dim or bright headlight beams to warn an oncoming motorist that he either has no lights on, or that he has (incorrectly) either his bright or dim beams on. This action requires that the driver's hand be taken from the steering wheel to operate the dash mounted switch, and it further requires that his attention to the road be momentarily distracted.

The object of this invention is to provide a means by which, through simple circuit changes and minor modifications to the electrical contact arrangement in the dash mounted switch, the distractions described in the previous paragraph may be eliminated.

Another important object of the present invention is to provide a lighting system for an automotive vehicle wherein the operator can change from parking lights to dim headlights, and from dim headlights to bright headlights without removing his hands from the steering wheel.

This object is accomplished by altering the circuit and the dash mounted switch, to make the floor mounted switch active when the dash mounted switch is in the mid or conventional parking light position. By so doing, the driver is able to change from parking lights to dim headlight beams, and vice versa, by operating the floor mounted switch alone, when the dash mounted switch is in the mid or conventional parking light position. The method by which this object is achieved is shown in the accompanying simplified schematic drawing showing the improved circuitry, and basic circuit components.

FIGURE 1 is a schematic of the electrical circuit, showing the floor mounted switch in one of its two possible positions, and showing the dash mounted switch in one of its three possible positions.

FIGURE 2 shows the floor mounted switch in its other possible position.

FIGURES 3 and 4 shows the dash mounted switch in its other two possible positions.

Numerals 1, 2, and 3 represents, respectively, the conventional bright headlight bams, dim headlight beams, and parking lights. The conventional power source (battery, generator, etc.) is represented by numeral 4. The conventional floor mounted, foot operated, two position, latching type switch is represented by numeral 5. The dash mounted, hand operated, three position switch, altered to meet the objective of the invention, is shown as numeral 6.

The floor mounted switch 5 is operated by depressing and then releasing button 7, which moves contact 8 away from contact 9 and into a communication with contact 10, or vice versa, depending on the position the switch was in when repressed. Contact 8 is always in communication with contact 11 (sliding or otherwise). The latching mechanism which permits this method of switch operation is conventional and well known, and therefore is not shown in detail.

The dash mounted switch 6 is operated manually pulling (or pushing, rotating, etc.) knob 12 to any one of the three possible switch positions. Contacts 13 and 14 are mechanically fastened to knob 12 through rigid nonconducting member 15, and contacts 13 and 14 therefore move in unison. Contact 16 is always in communication with contact 13, and contact 17 is always in communication with contact 14 (sliding or otherwise). In the fully depressed or off position, the contact configuration of the dash mounted switch 6 is as shown in FIGURE 1, with neither contact 18 nor 19 in communication with contact 14, and with contact 20 not in communication with contact 14.

When the dash mounted switch 6 is moved to the mid-position as shown in FIGURE 3, contact 13 communicates with contact 18, and contact 14 communicates with contact 20. Either the parking lights 3 or the dim headlight beams 2 will be on, depending on the position of the floor mounted switch 5 at the time. With the floor mounted switch 5 in the position shown in FIGURE 1, contact 8 is in communication with contact 9, and the parking lights 3 will be on. When it is desired to change to the dim headlight beams 2, the button 7 of floor mounted switch 5 is depressed and released, placing contact 8 in communication with contact 10, as shown in FIGURE 2.

When the dash mounted switch 6 is moved to its fully extended position, as shown in FIGURE 4, contact 13 communicates with contact 19, and contact 14 remains in communication with contact 20.

Either bright headlight beams 1 or the dim headlight beams 2 will be on, depending on the position of the dash mounted switch 5 at the time. With the floor mounted switch in the position shown in FIGURE 1, contact 8 is in communication with contact 9, and the bright headlight beams 1 will be on. When it is desired to change to the dim headlight beams 2, button 7 of the floor mounted switch 5 is depressed and released, placing contact 8 in communication with contact 10, as shown in FIGURE 2.

The system as described above shows only the basic circuit changes and alterations to the dash mounted switch required to achieve the object of the invention, namely, to make the conventional floor mounted switch an active part of the circuit, when the dash mounted switch is in the conventional parking light position. It should be obvious that the basic system described above in no way precludes the use of other conventional lighting circuit components, such as relays, fuses, photo sensitive dimmer switches, and the like.

What is claimed is:

1. A lighting control system for an automotive vehicle having bright headlights, dim headlights and parking lights comprising: a source of power electrically connected to said lights; a three position hand operated switch mounted on the dash of said automotive vehicle; means for electrically connecting said hand operated switch between said power source and said lights so that when said hand operated switch is in a first position all said lights are de-energized, when said hand operated switch is in a second position said parking lights and said dim headlights are capable of being energized, and when said hand operated switch is in a third position said bright headlights and said dim headlights are capable of being energized; a double pole switch; means for electrically connecting said double pole switch to said hand operated switch for selectively energizing said parking lights and said dim headlights when said hand operated switch is in said second position, and for selectively energizing said bright headlights and said dim headlights when said hand operated switch is in said third position; whereby by changing the position of said double pole switch said lights can be changed from parking lights to dim headlights and from dim headlights to bright headlights.

References Cited
UNITED STATES PATENTS 2,912,621   11/1959   Machalek _____ 315—83

JAMES W. LAWRENCE, *Primary Examiner.*

R. JUDD, *Assistant Examiner.*